United States Patent [19]

Toudou

[11] Patent Number: 4,591,705

[45] Date of Patent: May 27, 1986

[54] DATA PROCESSING DEVICE FOR INVENTORY CONTROL

[76] Inventor: Michiharu Toudou, 14-17, Jingumae 3-chome, Shibuya-ku, Tokyo, Japan

[21] Appl. No.: 511,537

[22] Filed: Jul. 7, 1983

[30] Foreign Application Priority Data

Mar. 17, 1983 [JP] Japan .................................. 58-43222

[51] Int. Cl.[4] .............................................. G06F 7/08
[52] U.S. Cl. .................................... 235/381; 235/385; 235/432; 364/403; 364/478; 364/567
[58] Field of Search ............... 235/381, 382, 383, 384, 235/385, 432; 177/4, 6; 364/403, 478, 567

[56] References Cited

U.S. PATENT DOCUMENTS

| | | | |
|---|---|---|---|
| 3,445,633 | 5/1969 | Ratner | 235/381 |
| 3,644,713 | 2/1972 | Hayakawa et al. | 235/381 |
| 3,853,267 | 12/1974 | Cadwell et al. | 364/567 |
| 3,961,747 | 6/1976 | Small et al. | 235/383 |
| 4,094,367 | 6/1978 | Jones et al. | 364/567 X |
| 4,476,381 | 10/1984 | Rubin | 235/385 X |

OTHER PUBLICATIONS

KEI-OKU Manual for Truck Scale, Jan. 28, 1980.

*Primary Examiner*—David L. Trafton
*Attorney, Agent, or Firm*—Jones & Askew

[57] ABSTRACT

Method and apparatus for determining the nature and amount of goods being moved into or out of a particular location, such as a stock yard or the like. The disclosed embodiment deals with trucks transporting material into or out of a stock yard. Each truck is weighed upon entering the stock yard, and again upon leaving the yard. Each truck operator carries a measurement permission card containing encoded information about the weight and identity of the truck, and the material being picked up or delivered. This information preferably is encoded on the permission card in bar code, and is read from the permission card. The detected gross weight and net weight of the truck, and possibly other information, are printed on a separate measuring sheet as part of the material delivery of pick-up operation. Operating steps are performed under control of a programmed computer.

10 Claims, 5 Drawing Figures

FIG. 3

| | MEAS. SH. | |
|---|---|---|
| 1 | NO. | Ⓐ 001 Ⓑ 008 |
| 2 | FIRST TIME | 82. 12. 31. 23. 50 |
| 3 | SECOND TIME | 82. 12. 31. 23. 59 |
| 4 | TRUCK NO. | 4321 |
| 5 | TRADER CODE | 999 * |
| 6 | TRUCK | 999 * |
| 7 | GROSS. WT. | 30.00Kg |
| 8 | TARE WT. | 10.00Kg * |
| 9 | NET WT. | 20.00Kg * |

(truck)(measval)(truck no.)

DATA PROCESSING DEVICE FOR INVENTORY CONTROL

BACKGROUND OF THE INVENTION

This invention relates in general to a data processing device applicable to the management of goods being added to an inventory and being withdrawn therefrom, and more particulary relates to such apparatus including a data code reading unit for reading information encoded on a data card, and code writing unit for writing additional data on a data card.

SUMMARY OF THE INVENTION

An object of the invention is to provide a data processing device having an operative section which includes functions both of writing and reading.

Another object of the invention is to provide a data processing device for improved operation of inventory control.

A further object of the invention is to provide a lightweight and compact data processing device.

Briefly described, these and other objects and advantages of the present invention are accomplished by providing apparatus comprising a printer for writing encoded information on a data card, and also comprising a code reading device for reading existing imprinted data on a card. A processing unit controls the reading device for reading data on the card, and the printer for printing data on the card.

Stated somewhat more particularly, the present invention provides automated control of goods removed from and delivered to a goods inventory, such as a stock yard or the like. This system determines whether goods passing through the portal of the stock yard are entering or leaving the yard, and also determines whether the goods carrier passing through the portal is loaded or unloaded. The present invention imprints the foregoing and other information on one or more appropriate cards, either in machine-readable form or in conventional numerals, or in both forms.

BRIEF DESCRIPTION OF THE DRAWING

FIG. 3 is a view showing an example of a measuring sheet as used in the disclosed embodiment of the data processing device.

DETAILED DESCRIPTION OF DISCLOSED EMBODIMENT

The following embodiment is described in the context of a data processing device constructed in accordance with the principles of the present invention, and applied to a truck scale.

This truck scale is installed in an entrance and an exit of a stock yard, for the purpose of measuring amounts of stock materials transported into or out of the stock yard by processing data based on the detected weights of a truck in the loaded and unloaded conditions. The scale comprises a read-out means for reading out coded information on a recognition card, showing selected predetermined information for a vehicle. The coded information is indicated in a prescribed code system, such as bar code. Upon entrance of the vehicle to the stock yard, the recognition card is inserted into a single card-insertion slot formed in the body of the data processing device. The read-out means also serves to read from the card, upon exit of the vehicle from the stock yard, the coded information on the recognition card and coded information printed on a recording card which is inserted, upon entrance of the vehicle, into the cards insertion slot together with the recognition card juxtaposed thereon.

The disclosed embodiment also includes a processing means for performing a prescribed arrangement of data-processing steps based on the coded information read out from the recognition card, and on the detected values as measured by the truck scale at the time of entrance or exit of the vehicle from the stock yard. A printing means is provided for printing at least the detected weight measured by the truck scale, and the results of processing accomplished by the processing means, on predetermined sections of the recording card at the time of entrance of the vehicle. The printing means further serves to print at least the amount of material transported into or out of the stock yard, on predetermined sections of the recording card at the time of exit of the vehicle.

Figure 1:
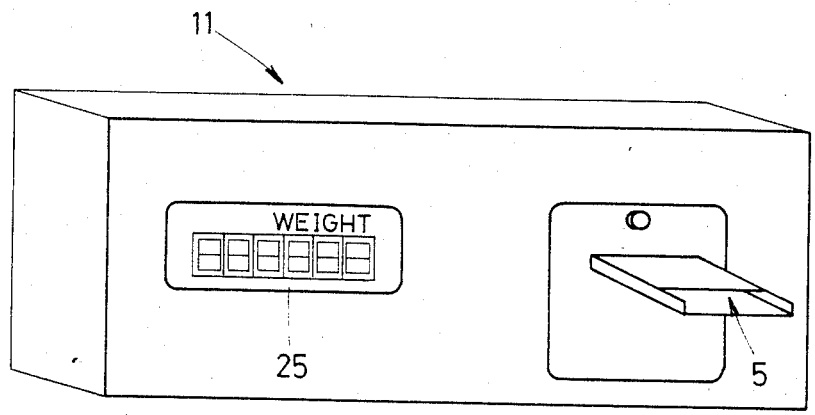
FIG. 1 is as perspective view of the data processing device according to a disclosed embodiment of the present invention.
Figure 2:
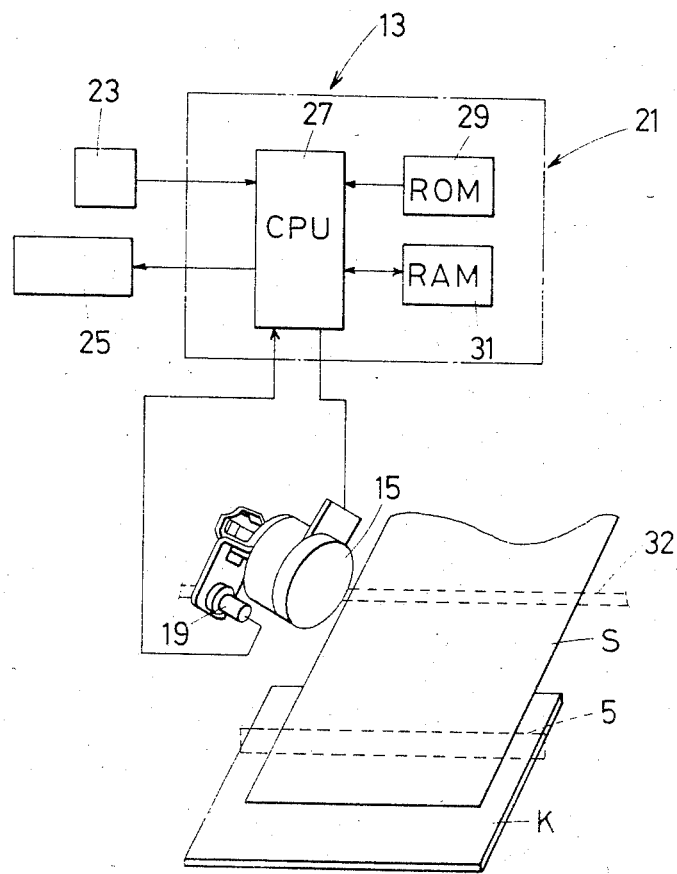
FIG. 2 is a schematic and partially block-diagram view showing the construction of the disclosed embodiment.

Referring now to FIGS. 1 through 3, the processing unit indicated generally at 11 as an operation control device 13 including, as shown in FIG. 2, a printer head 15 for printing various information on a predetermined measuring sheet S. This information includes machine-readable information preferably in the form of bar codes or the like, and preferably also includes visually-perceptible information in the form of English numbers or the like readily understood by people. The apparatus includes a photosensor 19 positioned to read out the bar code information on the sheet S, and carried on a part of the printer head 15 by a support member.

The operation control device 13 includes a microcomputer 21 for processing the various information. The microcomputer 21 performs predetermined processing on the basis output signals from the photosensor 19 and a load cell 23 provided in the truck scale, and sends out resultant indication signals to an indicator section 25 and resultant print signals to the printer head 15, respectively. The microcomputer 21 is constructed of a central processing unit (CPU) 27, a read-only memory (ROM) 29 for storing predetermined programs, and a random-access memory (RAM) 31 for temporarily storing data. A reflective-type sensor incorporating a light source is used for the photosensor 19.

FIG. 3 shows an example of a measuring sheet S for use with the processing means 11 of the preferred embodiment. Referring back to FIG. 2, the sheet S is juxtaposed to a printing ribbon 32 of the printer.

Figure 4:
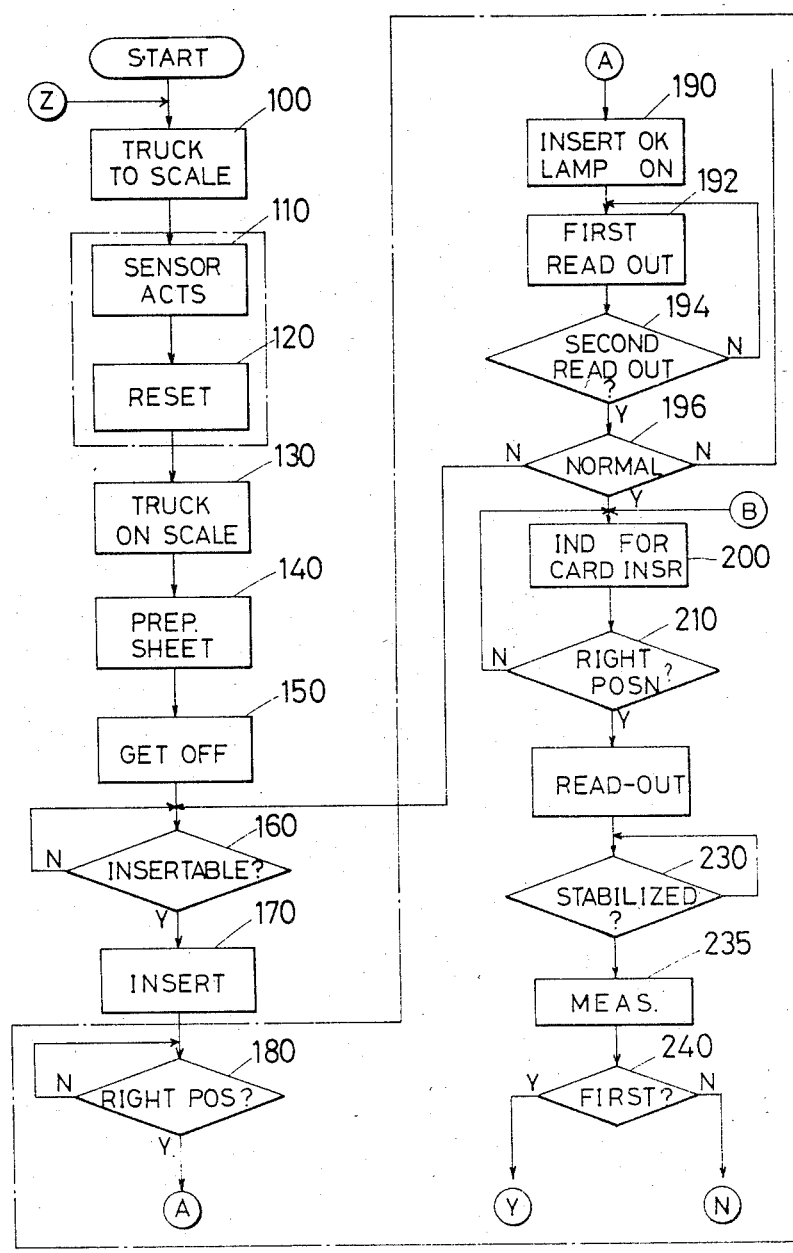
FIGS. 4 and 5 are flow chart illustrating the processing steps performed in the disclosed embodiment.
Figure 5:
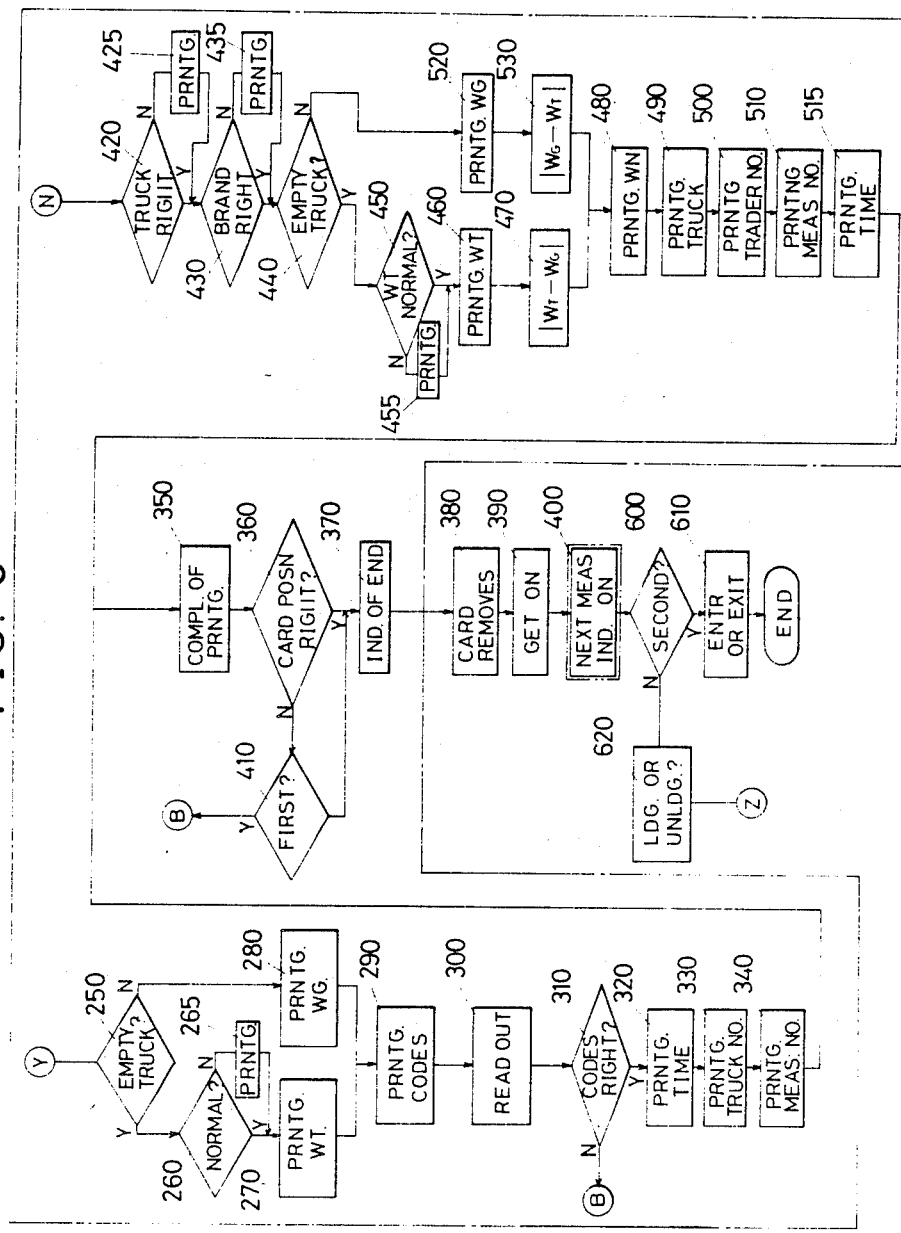

Operation of the disclosed embodiment is based on a sequential flow of processing steps, including the flow of the processing program of the CPU 27, as set forth in the flow chart of FIGS. 4 and 5. In these figures, the data processing within a chain-dotted line represents the flow of the processing program for the CPU 27.

The CPU 27 acts when the truck is approaching the truck scale to reset the amount of weight measured by the truck scale. This is accomplished, for example, by means of an entrance sensor (not shown) disposed in the middle of the entrance pass to the truck scale, the entrance sensor sending a signal to the truck scale upon detection of the approaching truck, as shown in steps 100 to 120 in FIG. 4. Thereafter, the operator drives the truck onto the truck scale and then gets out of the truck with a measurement permission card K and a measuring sheet S forming a recognition card as shown in FIG. 3. The permission card K is a recognition card on which are described, for example, the name of the material being transported, the tare weight of the vehicle as measured in an official inspection, the trader's code, and a truck number, all preferably in the form of bar code or the like. Subsequently, the operator confirms by the indication of the indicator section 25 on the processing means 11, that the processing means is in condition for measurement or processing. The operator then inserts the measurement permission card K into the card insertion slot 5 of the processing means 11, as indicated in steps 130 to 170 in FIG. 4. The CPU 27 detects by sensor (not shown) that the measurement permission card K has been inserted into a predetermined position, and turns on its related lamp to stop further insertion, whereby the codes on the measurement permission card K are scanned through the printer head 15. This scanning preferably is carried out two times for confirmation, by the photosensor 19 supported by the head 15, eliminating any reading error which may be caused by electrical noise, dirt, or the like.

CPU 27 also serves to give a prescribed indication to the operator for instructing him to insert the measuring sheet S into the slot 5 together with the measurement permission card K interposed thereon, as shown in steps 180 to 200. After detection of the measuring sheet S having been inserted to a predetermined position, the CPU 27 determines from the output signal obtained by scanning of the photosensor 19, whether or not the bar codes on the measuring sheet are present in the prescribed portion of the measuring sheet, and if present, reads out these bar codes. The CPU 27 also confirms the stabilization of the output signal from the load cell 23 and then reads out the gross weight of the truck, as shown in steps 210 to 235 in FIG. 4. Subsequently, from the previous judgment of the presence or absence of the descriptive bar codes on the measuring sheet S, the CPU 27 determines the fact that the truck on the truck scale is going into or out of the stock yard. As a result of this determination, the CPU 27 proceeds to a step 250 (FIG. 5) in the case of the entrance of the truck, or to Step 420 (FIG. 5) in the case of a truck leaving the stock yard, for further processing. Although not shown in the flow chart, when the descriptive bar codes are present in the step 220, the bar codes are read out twice to prevent misreading, as in steps 192 to 194.

If it is determined in step 240 that the truck is entering the stock yard, the CPU 27 acts to determine whether the truck carries a load or not. This determination is made from a difference between the gross weight of the truck, read out in the step 235, and the officially detected tare weight of the truck read out from the bar codes described in the measurement permission card K in the steps 192 to 196. As a result of this determination, the CPU 27 proceeds to the step 260 when the truck is unloaded, or to the step 280 when the truck is loaded, respectively.

After determination of the truck being unloaded, in case the difference between gross weight and the official tare weight of the truck exceeds a prescribed value, which should be in essence very small, the CPU 27 determines the tare weight in the measuring sheet S to be abnormal or incorrect, whereby a mark (*) is printed on the measuring sheet S and then the tare weight (WT) of the truck is also printed thereon, as shown in the steps 260 to 270.

Alternatively, if the CPU 27 determines that the truck is loaded, the CPU prints the detected gross weight of the truck on the gross-weight section of the measuring sheet S, as shown in step 280. Subsequently, the CPU 27 prints the name of the material, the measured value, and the truck number on the prescribed locations of the measuring sheet S in the form of bar codes, as a result of the bar codes previously read out from the measurement permission card K and the measured value of the gross weight of the truck. Thereafter, the printer head 15 is moved again, as in the preceding steps 192 to 196, to read out two times the printed bar codes by means of the photosensor 19 for confirmation of their correct printing. Thus, the date and time of entrance, the truck number, and the measuring number indicating the entrance order of the truck, are respectively printed on the prescribed sections of the measuring sheet S, and thereafter the CPU 27 proceeds to the step 350, as shown in the steps 290 to 340. Incidentally, in the step 310, if there is an abnormality in the printed bar codes resulting from noise in the surrounding environment, or a failure in feeding the measuring sheet S by the printer, the CPU 27 returns the processing to the step 200 to give an indication of instructions to the operator for feeding a new measuring sheet into the printer.

Assume now the case where, as shown in the step 240, it has been determined that the truck on the truck scale is going out of the stock yard, leading to the steps 420 to 530. The CPU 27 confirms the truck number and the name of material from the bar codes on the measurement permission card K and the bar codes printed on the measuring S upon entrance of the truck as shown in the step 290, and determines from the gross weight of the truck on the truck scale that the truck has been loaded or unloaded. As a consequence, the CPU 27 proceeds to the step 450 in case of the truck being unloaded, or to the step 520 in the case of the truck being loaded, as shown in steps 420 to 440. In this connection, when in the course of processing in the steps 420 to 430, an error or inconsistency is located in the truck number and the name of material from the bar codes and measurement permission card K printed on the measuring sheet S upon entrance of the truck, as shown in the step 290, a mark (*) indicating abnormality is printed on the trader's number section and the material name section of the measuring section S, as shown in the steps 425 to 435.

After determining that the truck is entering the stock yard, the CPU 270 compares the gross weight read out from the bar codes on the measurement permission card K in the steps 192 to 196, and for the reasons mentioned above, if a difference between the gross weight and the tare weight exceeds a prescribed value, the tare weight is printed on the tare weight section of the measuring sheet S together with a mark (*) indicating abnormality. The difference between the tare weight and the gross weight (WG) of the truck upon entrance is calculated, giving the net weight (WN) of the material to be transported into the stock yard as shown in steps 450 to 480. Thereafter, the CPU 27 prints the date of leaving, the name of the material loaded, the trader's number, and the measuring number indicating the leaving order of the truck and then proceeds to the step 350, as shown in steps 490 to 515.

On the other hand, where it is determined that the truck is being loaded in the step 440, the CPU 27 prints the gross weight (WG) of the truck on the measuring sheet S and calculates the difference between the gross weight (WG) and the tare weight (WT) of the truck printed on the measuring sheet S in the form of bar codes upon entrance of the truck. This difference denotes the net weight (WN) of the material loaded on the truck. The CPU 27 then prints the calculated value on the measuring sheet S and proceeds to the aforementioned step 480, as shown in steps 520 to 530.

In the course of data processing as the truck enters or leaves the stock yard, the CPU 27 confirms the final position of the measuring sheet S at the time of completion of printing thereon, to be correct without any mislocation due to problems such as a feed failure in the measuring sheet, and then gives an indication of completion of processing. Thereafter, the CPU 27 puts out an indication that it is ready for the next measuring operation, after confirming that the operator has removed the measurement permission card K and the measuring sheet S, as shown in the steps 350 to 400. It should be noted that in the steps 360, if the position of the measuring sheet S is incorrect, the CPU 27 determines whether the processing prior to the step 360 is performed at the time of entrance in the steps 250 to 340, or at the time of leaving in the steps 420 to 530, and returns to the step 200 in case of the former or proceeds to the step 370 in case of the latter, as shown in the step 410.

Following the conclusion of the foregoing processing steps, the operator moves the truck in order to transport the material into or out of the stock yard, as shown in steps 600 to 620.

In the embodiment as thus described, a comparison is made between the officially measured tare weight of the truck and the tare weight of the truck measured by the truck scale, and the truck numbers and the names of the materials also are compared at the time of entrance and leaving of the truck. By these comparisons, for example, if a particular truck is first measured and then another truck is measured, it is impossible to prepare a correct measuring sheet without any error mark (*) so that only a measuring sheet of the particular truck or particular trader's name can be issued, or so that a measuring sheet S naming a particular kind of material cannot be issued from a measurement permission card K showing a different kind of material.

In this connection, it should be noted that where the present invention is intended only to improve the operation of the truck scale, the measurement permission card K can be omitted. Further, in rainy weather, the net weight of the material loaded on the truck may be calculated to be heavier than its real or dry weight, due to moistening of the material. In such case, however, the measuring sheet S may be provided with an additional section in which a clerk in charge can write down the codes indicating the degree of wetness of the material, whereby the processing device can put out the dry weight of the material by calculation. Moreover, if the clerk writes into the measuring sheet S the code indicating the moisture content of the material at the time the truck departs, such information can be printed onto the measuring sheet S.

It can now be seen from the foregoing description that the described embodiment calculates the amount of material to be transported by the vehicle into or out of the stock yard, detects abnormalities in the course of calculation, and outputs various information according to the programming of the processing control device, on the basis of the vehicle weights measured by the truck scale at the time of entering and leaving the stock yard. This operation provides the following advantages as compared with conventional apparatus and techniques:

(1) The amount of material to be transported into or out of the stock yard by a vehicle is automatically calculated and printed, to avoid any human mistake as well as to enable full automation of the material measuring location.

(2) Because there is no manually operated means such as an operating key and switch, a significant savings of labor is realized over previous systems which required various means for calculating amounts of incoming and outgoing material. This has the additional benefit of eliminating human error and improving the workability of the system, for a substantial reduction in cost. Moreover, the present automated system leaves no room for unfair or dishonest operation of the data processing apparatus.

(3) It is possible to check various abnormalities or errors in a series of processing steps for calculating the amount of incoming or outgoing materials being transported, so that upon occurrence of abnormalities, such abnormalities are printed out with an error mark calling attention to their existence and thereby preventing unfair practices.

Though the present invention is applied to a truck scale and the embodiment as described above, the invention is also applicable without any limitation to the management of parking places, diagnostic cards used in hospitals, simplified credit cards, inventory control, and any other similar application.

What is claimed is;

1. A data processing method for loading and unloading in a stock yard with data processing apparatus for reading and writing codes on a card showing information, said method comprising the steps of:
inserting into the apparatus a measuring sheet and a permission card provided with coded information showing the type of a truck at a portal of the yard;
thereafter determining whether the truck is entering or leaving the stock yard by detecting the absence or presence, respectively, of coded information on said measuring sheet;
measuring the weight of the truck by means of a truck scale connected to the apparatus; and
if the truck was determined to be entering the stock yard, printing on the measuring sheet encoded information corresponding to the type of truck in response to the coded information on the permission card, and also printing encoded information the measured weight of the truck, or
if the truck was determined to be leaving the stock yard, printing on the measuring sheet the differential weight between the measured weight and the truck weight corresponding to the information encoded on said measuring sheet.

2. The data processing method of claim 1, wherein said weight of the entering truck is printed in terms of both the coded information and Arabic numerals.

3. The data processing method of claim 1, comprising the steps of reading the coded information at least two times; and comparing said readings for identity, thereby indicating that the coded information was read correctly.

4. The data processing method of claim 1, further comprising the step of determining an abnormal situation by:
predicting the tare weight of the truck in response to the type of truck encoded on the permission card;
comparing the predicted tare weight with the measured weight of the truck when the truck is determined to be entering the stock yard;
comparing the predicted tare weight with the differential weight of the truck when the truck is determined to be leaving the stock yard;
determining an abnormal weight condition if either comparison exceeds a prescribed value; and
printing a mark on the measuring sheet indicating an abnormality in response to determining an abnormal weight condition.

5. The data processing method of claim 1, further comprising the step of printing an abnormality-indicating mark on the measuring sheet if the code of vehicle type printed on the measuring sheet is not coincident to the code of vehicle type on the permission card when the truck is determined to be leaving the stock yard.

6. The data processing method of claim 1, further comprising the step of determining whether the truck has been loaded or unloaded at the portal of the yard, in response to said measured weight of the truck.

7. The data processing method of claim 1, further comprising the steps of:
when the truck is determined to be entering the stock yard, comparing the measured weight to the official tare weight encoded on the permission card and determining either (a) the entering truck is loaded when the measured weight exceeds the official tare weight by a prescribed amount, or (b) the entering truck is empty when the measured weight does not exceed the official tare weight by the prescribed amount; and
when the truck is determined to be leaving the stock yard, comparing the present measured weight to the measured weight previously printed on the measuring sheet when the truck entered the stock yard, and determining either (a) the leaving truck is loaded when the present measured weight exceeds the previous measured weight printed on the measuring sheet, and (b) the leaving truck is empty when the present measured weight is less than the previous measured weight printed on the measuring sheet.

8. The data processing system as in claim 7, further comprising the steps of:
when the truck is determined to be entering is empty, printing the measured weight on the measuring sheet as the actual tare weight of the truck;
when the truck is determined to be entering loaded, printing the measured weight on the measuring sheet as the gross weight of the truck;
when the truck is determined to be leaving empty, printing the differential between the entering weight and the leaving weight as the amount of material transported into the stock yard; and
when the truck is determined to be leaving full, printing the differential between the leaving weight and entering weight as the amount of material transported out of the stock yard.

9. Data processing apparatus for determining the loading and unloading of trucks in a stock yard having a truck scale providing an output signal indicating the measured weight of a truck, comprising in combination:
code reading means operative to produce signals in response to encoded information on a measuring sheet and in response to a separate permission card both selectably inserted in the code reading means;
a printer associated with said code reading means and operative to print coded information on the measuring sheet;
processor means responsive to signals from said code reading means indicating insertion of a measuring sheet lacking imprinted coded weight information, and operative to cause said printer to print coded weight information on said measuring sheet corresponding to the measured weight signal from the truck scale, and also operative to cause said printer to print information read from the permission card, thereby determining from the detected absence of imprinted coded weight information on the measuring sheet that the truck is entering the stock yard; and
said processing means additionally responsive to signals from said code reading means indicating insertion of a measuring sheet including previously imprinted coded weight information, thereby determining that the truck is leaving the stock yard, and thereupon operative to cause said printer to print on said measuring sheet the differential weight between the measured weight from the truck scale and the weight previously encoded on said measuring sheet,
thereby producing a record on the measuring sheet showing the weight of the truck upon entering the stock yard and the differential weight corresponding to the amount of material loaded or unloaded between entering and leaving the stock yard.

10. Apparatus as in claim 8, wherein:
said card reading means is operative to produce signals in response to encoded information on said permission card indicating to the official tare weight of the truck; and
said processing means is operative to compare the encoded official tare weight information with the measured weight information from the truck scale corresponding to actual tare weight of the truck, and operative to cause said printer to print information on said measuring sheet indicating an abnormal condition if the differential between measured tare weight and official tare weight exceeds a predetermined amount.

* * * * *